United States Patent
Sanso et al.

(10) Patent No.: US 10,255,442 B2
(45) Date of Patent: Apr. 9, 2019

(54) CONTROLLED PUBLICATION OF SENSITIVE CONTENT

(71) Applicant: ADOBE INC., San Jose, CA (US)

(72) Inventors: Antonio Sanso, Duggingen (CH); Philipp Suter, Zurich (CH)

(73) Assignee: Adobe Inc., San Jose, CA (US)

(*) Notice: Subject to any disclaimer, the term of this patent is extended or adjusted under 35 U.S.C. 154(b) by 124 days.

(21) Appl. No.: 15/352,450

(22) Filed: Nov. 15, 2016

(65) Prior Publication Data

US 2018/0137292 A1    May 17, 2018

(51) Int. Cl.
| | |
|---|---|
| *G06F 11/30* | (2006.01) |
| *G06F 21/60* | (2013.01) |
| *G06F 21/62* | (2013.01) |
| *H04L 9/32* | (2006.01) |

(52) U.S. Cl.
CPC ........ *G06F 21/602* (2013.01); *G06F 21/6209* (2013.01); *G06F 21/6254* (2013.01); *H04L 9/3221* (2013.01)

(58) Field of Classification Search
CPC ... G06F 21/60; G06F 2221/2107; G06F 21/64
USPC ........................................................ 713/189
See application file for complete search history.

(56) References Cited

U.S. PATENT DOCUMENTS

| | | | | |
|---|---|---|---|---|
| 6,603,857 B1* | 8/2003 | Batten-Carew | ....... | H04L 9/0869 380/260 |
| 9,003,545 B1* | 4/2015 | Oliver | ..................... | H04L 9/088 726/26 |
| 2004/0123111 A1* | 6/2004 | Makita | ................ | G06F 21/6209 713/176 |
| 2006/0075343 A1* | 4/2006 | Henry | .................. | G11B 31/006 715/704 |
| 2007/0174486 A1* | 7/2007 | Holstege | ............. | G06F 17/3089 709/246 |
| 2008/0010365 A1* | 1/2008 | Schneider | ............ | G06Q 10/109 709/223 |
| 2010/0185863 A1* | 7/2010 | Rabin | ..................... | H04L 9/085 713/171 |

(Continued)

OTHER PUBLICATIONS

Aguilar et al, A New Zero-Knowledge Code Based Identification Scheme with Reduced Communication, IEEE, Nov. 7, 2011, pp. 648-652.*

(Continued)

*Primary Examiner* — Christopher J Brown
*Assistant Examiner* — Jenise E Jackson
(74) *Attorney, Agent, or Firm* — Brake Hughes Bellermann LLP

(57) ABSTRACT

Systems and methods are disclosed herein for publishing sensitive content at a future time, where prior to the future time, receiving an encrypted version of the sensitive content is received and a sequence of proof rules are applied to random portions of the encrypted version of the sensitive content. Upon successful application of the sequence of proof rules, the encrypted version of the sensitive content is prepared for publication and optionally published in encrypted form. At the future time, an encryption key is received for the encrypted version of the sensitive content and the encrypted version of the sensitive content is decrypted with the encryption key to produce the sensitive content.

16 Claims, 5 Drawing Sheets

(56) References Cited

U.S. PATENT DOCUMENTS

| | | | | |
|---|---|---|---|---|
| 2013/0282678 A1* | 10/2013 | Wilson | ............... | G06F 21/645 |
| | | | | 707/694 |
| 2014/0075200 A1* | 3/2014 | Uchida | ............ | H04L 9/3247 |
| | | | | 713/176 |
| 2014/0268244 A1* | 9/2014 | Sheridan | ............ | G06Q 10/10 |
| | | | | 358/403 |
| 2014/0285854 A1* | 9/2014 | Murao | ............... | H04L 9/3239 |
| | | | | 358/3.28 |
| 2015/0195254 A1* | 7/2015 | Stiglic | .................. | H04L 9/14 |
| | | | | 713/171 |

OTHER PUBLICATIONS

Catalano et al, Zero-Knowledge Sets with Short Proofs, IEEE, vol. 57, No. 4, Apr. 4, 2011, pp. 2488-2502.*
Lu et al, Psuedo Trust: Zero-Knowledge Based Authentication in Anonymous Peer-to-Peer Protocols, IEEE, Feb. 2, 2008, pp. 1-10.*
Chalkias, Konstantinos, et al., "Improved Anonymous Timed-Release Encryption", European Symposium on Research in Computer Security, Springer, Berlin, Heidelberg, 2007, 16 pages.
Jager, Tibor, "How to Build Time-Lock Encryption", IACR Cryptology ePrint Archive (2015): 478, 32 pages.
Liu, Jia, et al., "Extractable Witness Encryption and Timed-Release Encryption from Bitcoin", IACR Cryptol. ePrint Arch 482, 2015, 29 pages.
Rivest, Ronald L, et al., "Time-lock puzzles and timed-release Crypto", Revised Feb. 21, 1996, 8 pages.
Wu, Huixin, et al., "A Survey of Noninteractive Zero Knowledge Proof System and Its Applications", The Scientific World Journal, 2014, Article ID 560484, 7 pages.

* cited by examiner

CONTROLLED PUBLICATION OF SENSITIVE CONTENT

TECHNICAL FIELD

This disclosure relates generally to computer-implemented methods and systems and more particularly relates to publication of sensitive content at a future time.

BACKGROUND

Many publishers of content face difficulties relating to releasing their content for publication at an appropriate time. For example, some financial institutions have a requirement at the end of each financial quarter to publish financial reports within a specific, short, timeframe. As another example, some periodicals and newspapers attempt to publish both electronic and hard-copy versions of their content simultaneously. As yet another example, certain authors and publishing houses have business models based on a staged release of new content in the form of novels, where hard backed versions are released first, followed later in time by paperback versions, and perhaps followed still later in time by electronic versions. Timed publication, especially electronic publication, can present surprising difficulties considering that the content is typically already in electronic form. For example, there are dangers of inadvertent early publication given the ready nature of the content. Moreover, there are certain authoring aspects to consider given the wide variety of devices upon which electronic content is consumed and the selection of particular content formatting.

SUMMARY

Systems and methods are disclosed herein for publishing sensitive content at a future time. An exemplary method involves receiving an encrypted version of a sensitive document, web-page, data, or other content. In one example, the sensitive content is a lengthy, encrypted, PDF report of a financial institution's quarterly results received on an experience managing program for later publication on the institution's website. The method applies a sequence of proofing rules to the encrypted version of the sensitive content. As an example, the proofing rules are any that allow verification that the encrypted content is what it purports to be without allowing the experience managing program to access the sensitive content. In one particular example, the proofing rules include an interactive zero knowledge proof. In this instance, the experience managing program queries a source having access to the unencrypted content about a portion of the content. Upon receipt of a query, the source applies a hash function to the portion of the content which obscures the actual content, but preserves the content's format, grammar, layout and the like. The experience managing program then compares the output of the hash function to those aspects expected in the content at the requested portion.

Upon successful application of the sequence of proof rules, the method prepares the encrypted version of the sensitive content for publication. In one example, the method publishes the encrypted version of the content to the institution's web page, while in others the method saves the publication-ready content for later publication. At the appropriate future time, an encryption key is received and the content is decrypted and, if needed, published or re-published.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
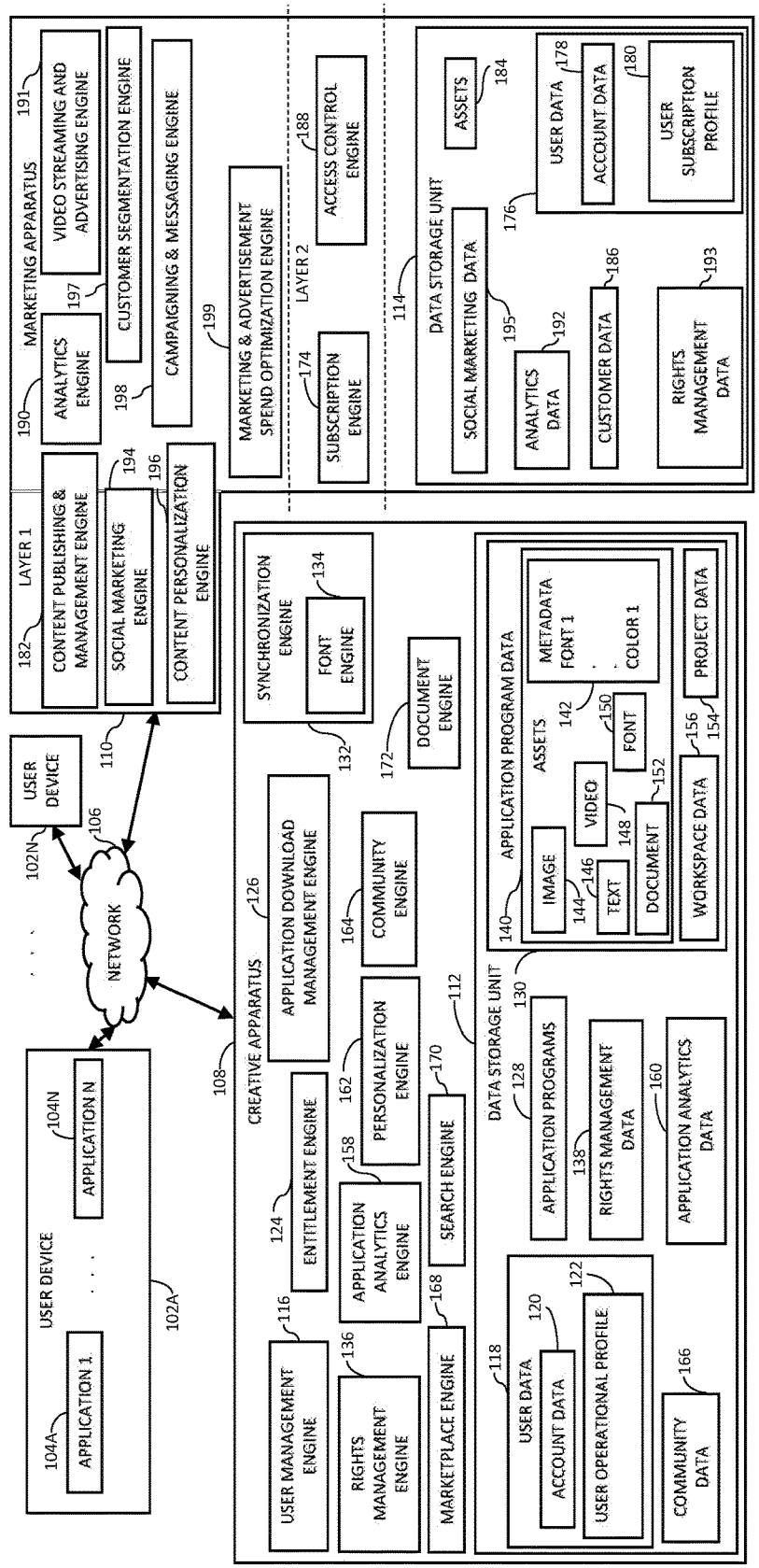
FIG. 1 is a diagram of an environment in which one or more techniques of the invention can be practiced.

This disclosure describes techniques that enable content publishers, such as financial institutions, authors, compliance personnel, news organizations, industry PR personnel, and the like to control precisely when content may become available electronically such as on a web-site. Currently, there are often regulatory or business reasons that dictate the publication of certain data. As one specific example, at the end of each financial quarter many financial institutions and companies need to publish financial reports within a specific timeframe. In some cases, this time frame is only 15 minutes long, where for example, financial data is required to be published between 9:00 am and 9:15 am on a specific day. In certain instances, the institutions must publish the financial report exactly within the timeframe—not before or after. If the institution fails to comply they risk financial as well as reputational harm.

Compounding the timing issues, in many cases the content itself is voluminous. Referring again to the quarterly financial reports, usually these entail a set of large files (e.g. pdf) of several megabytes or more each depending on the length, graphical complexities, embedded audio/video and other known drivers of content size. Due to security concerns, the reports may not be available until just before the window opens. The user must then take the time to upload, ready, format, and proof the entire report in a content/publication manager such as Adobe Experience Manager™. When network availability and reliability issues are considered along with document size and short timing windows it is not difficult to envision instances of failing to timely meet the reporting requirements and suffering the financial, competitive and/or reputational harm associated with the failure.

Embodiments of the invention address one or more of the issues of prior publishing techniques by breaking the publishing of sensitive content into two phases. Initially the sensitive content is published in an encrypted form (e.g., encrypted using symmetric or asymmetric encryption). This can be done before the future time at which publication of the sensitive information is intended without the risk of disclosing the sensitive content. The encrypted sensitive information, however, is prepared for publication since it is placed on the publication server or other publication location.

At the future time, e.g., within a desired publication time window, the information needed to decrypt the sensitive content is provided and used to decrypt the information. Since the information is already on the publication server or other publication location, it is effectively published as soon as it is decrypted. Long upload times can be avoided and tight publication windows complied with more easily and accurately.

Thus, techniques of the invention provide better ways for publishing sensitive content at particular times, for at least the reason that, the data transfer at that time, e.g., in the publication time window, can be significantly smaller. Rather than having to upload large financial reports, for example, those reports are uploaded in advance in encrypted form such that a small transmission of the key or other decryption information makes the reports available. Accordingly, the invention addresses, among other things, network specific problems that can otherwise impair and prevent the publication of sensitive materials at particular times. The techniques are more efficient, more stable, and reduce risks associated with publishing sensitive content using electronic networks and devices.

Techniques of the invention can additionally or alternatively ensure that the encrypted sensitive content is the correct data without exposing the sensitive content to early publication. For example, the techniques can apply a sequence of proof rules to random portions of the encrypted version of the sensitive content to ensure that the wrong content was not erroneously or intentionally provided as the sensitive content. Similarly, the proofing techniques can ensure that the proofing process does not expose the sensitive content unintentionally by ensuring that the proofing agent does not gain access to the sensitive content itself. The nature of publishing sensitive content on servers and otherwise using electronic networks to store the sensitive content and carry out proofing processes creates network specific risks of exposure of the sensitive content prior to the publication time. Techniques of the invention enable publication of encrypted sensitive content and proofing of the sensitive content in ways that address the risks inherent in network environments.

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

"Digital tool," as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108 and the marketing apparatus 110.

"Digital experience," as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

"Content," as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

"Proof rules," as described herein, includes an interactive request and respond interaction between systems to verify that an encrypted version of sensitive content contains the actual sensitive content it purports to have. During the request and respond interaction, certain sample portions of the sensitive content are revealed in obscured form for comparison against particular aspects that would be expected in the requested portion of the sensitive content.

FIG. 1 is a diagram of an environment 100 in which one or more embodiments of the present disclosure can be practiced.

The environment 100 includes one or more user devices, such as a user device 102A up to a user device 102N. Each of the user devices is connected to either a creative apparatus 108 or a marketing apparatus 110 or to both via a network 106. A user of the user device uses various products, applications, or services supported by the creative apparatus 108 or the marketing apparatus 110 or both via the network 106.

The user devices 102A-102N correspond to various users. Examples of the users include, but are not limited to, creative professionals or hobbyists who use creative tools to generate, edit, track, or manage creative content, marketing professionals who use marketing tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Examples of the user devices include, but are not limited to, a personal computer (PC), tablet computer, a desktop computer, a processing unit, any combination of these devices, or any other suitable device having one or more processors. Each user device includes at least one application supported by the creative apparatus 108 or the marketing apparatus 110.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

In some embodiments, the user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The synchronization engine 132 also includes a font engine 134 for synchronizing or storing fonts included as part of the application program data 130. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

The user can have one or more user devices. The application program data 130 is accessible by the user from any device, i.e. including the device which was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user are logged in then a newly created asset or updates to the application program data 130 are provided in real time. The rights management engine 136 is also called to determine whether the newly created asset or the updates can be provided to the other user or not. The workspace data 156 enables the synchronization engine 132 to provide same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. All this synchronization happens in real time or near real time. Similarly, synchronization of any type of the application program data 130 can be performed.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user state and options are provided to the user for publishing using the digital publishing application or any other application. In addition, while preparing the article, a recommendation can also be made by the synchronization engine 132 to incorporate some of other assets saved by the user and relevant for the article. Such recommendation can be generated using one or more engines as described herein.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, a plurality of users are assigned different tasks related to the work.

The creative apparatus 108 also includes a marketplace engine 168 for providing marketplace to one or more users. The marketplace engine 168 enables the user to offer an asset for selling or using. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

It is to be appreciated that the engines and working of the engines are described as examples herein and the engines can be used for performing any step in providing digital experience to the user.

The marketing apparatus 110 includes one or more engines for providing one or more digital experiences to the user. The marketing apparatus 110 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 110 also includes a data storage unit 114. The data storage unit 114 can be implemented as one or more databases or one or more data servers. The data storage unit 114 includes data that is used by the engines of the marketing apparatus 110.

In one embodiment, the marketing apparatus 110 can be divided into two layers of engines, i.e. Layer 1 including core engines that provide workflows to the user and Layer 2 including shared engines that are shared among the core engines. Any core engine can call any of the shared engine for execution of corresponding task. In another embodiment, the marketing apparatus does not have layers and each core engine can have an instance of the shared engines. In either embodiment, each core engine can access the data storage unit 114 directly or through the shared engines.

The user of the user device 102A visits a webpage or an application store to explore applications supported by the marketing apparatus 110. The marketing apparatus 110 provides the applications as a software as a service (SaaS), or as a standalone application that can be installed on the user device 102A, or as a combination. The user creates an account with the marketing apparatus 110 by providing user details and also by creating login details. Alternatively, the marketing apparatus 110 can automatically create login details for the user in response to receipt of the user details. The user can also contact the entity offering the services of the marketing apparatus 110 and can get the account created through the entity. The user details are received by a subscription engine 174 and stored as user data 176 in the data storage unit 114. In some embodiments, the user data 114 further includes account data 178 under which the user details are stored.

The user can opt for subscription of one or more engines of the marketing apparatus 110. Based on subscription details of the user, a user subscription profile 180 is generated by the subscription engine 174 and stored. The user subscription profile 180 is stored in the data storage unit 114 and indicates entitlement of the user to various products or services. The user subscription profile 180 also indicates type of subscription, i.e. premium subscription or regular subscription.

The marketing apparatus 110 includes a content publishing and management engine 182 that enables the user to create websites and other content. The content publishing and management engine 182 provides an end to end workflow to the user right from creation of content, to hosting of content, to publishing of content, and finally, to management, i.e. editing and republishing, of content. The content publishing and management 182 further includes one or more engines (not shown in FIG. 1), such as asset management engine, website management engine, mobile content management engine, form management engine, search engine and community management engine to enable one or more workflows. The user can create content, such as forms, mobile application or webpage content, using the content publishing and management 182. The user can either do the creation or can send it for creation to third party via workflows provided through the content publishing and management engine 182. The user then publishes the content and manages it through the content publishing and management engine 182. The user can also create communities or forums for discussions with customers and manage the communities through the content publishing and management engine 182. The content publishing and management engine 182 also provides asset management capabilities including asset searching using various tags and metadata. The content publishing and management engine 182 stores assets 184 in the data storage unit 114. Examples of the assets 182 include, but are not limited to, image, text, document, video, audio, font, and metadata. In addition, the content publishing and management engine 182 enables multisite, i.e. multiple websites and mobile content, management workflows, and commerce, i.e. personalized shopping experiences that incorporate video, social, and other dynamic media, related workflows. For some of the functionalities, such as asset management, the content publishing and management engine 182 can work in conjunction with the creative apparatus 108 and access data from the data storage unit 112.

Each engine of the marketing apparatus 110 also stores customer data 186 for the user in the data storage unit 114. The user or the entity of the user can have one or more customers, including potential customers, and hence, the one or more engines of the marketing apparatus 110 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the marketing apparatus 110 or each engine can have one instance of the access control engine 188. The access control engine 188 determines if the user has access to a particular customer data 186 based on the subscription of the user and access rights of the user.

The marketing apparatus 110 also includes an analytics engine 190. The user can enable tracking of the content while creating the content or at any other point. Various methods of tracking can be used. For example, tracking code can be embedded into the content for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user. In addition, in one embodiment, the analytics engine 190 also acts as a shared engine and is accessible by other engines to obtain meaningful analysis on basis of which other engines can offer various functionalities to the user. In another embodiment, each engine can have an instance of the analytics engine 190 which is customized according to need of that engine. The analytics engine 190 is used for tracking all types of content, such as mobile application, video, image, website, document, advertisement, and also for tracking the assets 184. The analytics engine 190 also supports predictive intelligence to provide predictions based on the analytics data 192. The analytics engine 190 also stitches information tracked from various sources where the content is consumed and provides a holistic view, i.e. 360 degrees' view of the analytics data 192.

The marketing apparatus 110 also includes a social marketing engine 194 for providing social marketing related workflows. The social marketing engine 194 allows the user to share the content on social networks, and then manage the content sharing and associated information, such as posts and comments. For example, the social marketing engine 194 provides recommendations to the user to determine when to post which content and to determine how audience will react to the post, helps the user to respond to queries from viewers of post, and performs other managing related to the post. In addition to the social networks, the social marketing engine 194 also provides workflows to manage content on blog, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 110. Alternatively, the engines can have an instance of the social marketing engine 194 and can directly access the social marketing data 195.

The marketing apparatus 110 also includes a content personalization engine 196. The content personalization engine 196 enables the user to provide different digital experiences to the customers when different customers visit same webpage or same application of the user. The content personalization engine 196 provides various workflows to the user to create different versions of the webpage or the application or the content and to perform A/B testing. Based on the testing, the user may choose to provide different personalization for different sets of customers. The content personalization engine 196 also uses the customer data 186 which can be part of the analytics data 192, in one embodiment, or can be stored separately in another embodiment. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented. The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

The marketing apparatus 110 also includes a campaigning and messaging engine 198 that enables workflows for the user to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments. A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user. The user can specify attributes for customer segmentation and the campaigning and messaging engine 198 automatically picks the customers to whom the message is to be sent and also personalizes the message based on the attributes of the customer segment. The campaigning and messaging engine 198 also provides A/B testing option to the user to test which message to send out of two messages. The campaigning and messaging engine 198 also stores different customer segments for each user in the customer data 186. In addition, the content used for creating personalized messages, email identifiers and other data is stored as part of the customer data 186 which can be specific for the user and inaccessible to other users.

The marketing apparatus 110 also includes marketing and advertisement spend optimization engine 199. The marketing and advertisement spend optimization engine 199 helps the user in budget management for running marketing campaigns, showing advertisements on websites, as search results, social advertisements, and other form of advertising. The marketing and advertisement spend optimization engine 199 tracks budget spend of the user and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing content performed. The customer data 186 further indicates what type of customers visited the marketing content and the analytics data 192 further indicates who all among those customers ended up in performing a transaction.

In various embodiments, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user.

The marketing apparatus 110 also includes a video streaming and advertising engine 191 that helps the user, such as broadcasters, cable networks and service providers create and monetize engaging and personalized viewing experiences. The video streaming and advertising engine 191 can be implemented to provide a software development kit to the user to build and deliver videos to the customers. In addition, the video streaming and advertising engine 191 provides workflows to the user to insert advertisement within the videos and provides recommendations to the user for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user. For example, if a video is paid then the video streaming and advertising engine 191 does not provide access to the customer based on the rights management data 193. Using the rights management data 193, the video streaming and advertising engine 191 protects content rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

Although the creative apparatus 108 and the marketing apparatus 110 are described and shown separately, there are many workflows in which engines of the creative apparatus 108 and the engines of the marketing apparatus 110 work together. For example, when the content is created using the creative apparatus 108 then code corresponding to the engines of the marketing apparatus 110 is included in the content to track content using the engines of the marketing apparatus 110. Also, the data tracked by the engines of the marketing apparatus 110 can then be consumed by the engines of the creative apparatus 108 to provide enhanced offerings to the user. Similarly, content created by the engines of the creative apparatus 108 can be consumed by the engines of the marketing apparatus 110 while creating the content using the marketing apparatus 110. It is to be appreciated that the two apparatuses can be implemented on same or different servers or platforms or cloud infrastructures. Also, there can be scenarios when engines of the marketing apparatus 110 and the creative apparatus 108 can be combined into one. For example, the application analytics engine 158 and the analytics engine 190 can be implemented using one single analytics engine. Similarly, there can be scenarios when data of the user who is using both the creative apparatus 108 and the marketing apparatus 110 can be stored in a single data storage unit or in a data storage unit shared by both the apparatuses.

Figure 2:
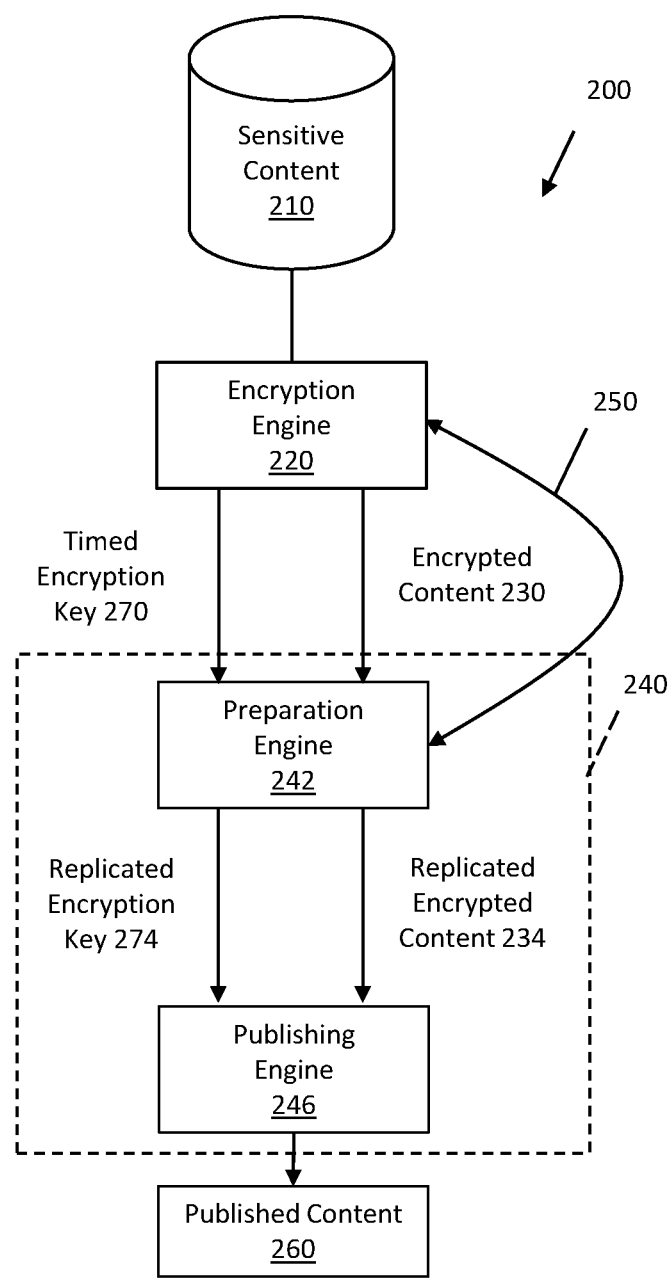
FIG. 2 illustrates a conceptual system and method for publishing sensitive content.

FIG. 2 illustrates one embodiment of a system 200 for publishing sensitive content at a future time that may be implemented by an exemplary creative apparatus 108, exemplary marketing apparatus 110, or both. Sensitive content 210 is provided to or requested by an encryption engine 220. As a particular example, sensitive content 210 may take the form of a periodic financial disclosure document which is to be made public at a particular future time. The document may be created by creative apparatus 108 or by other means.

One aspect of the system and method of this disclosure is to help ensure that the sensitive content 210 is not made public before the particular future time. As one exemplary step toward this goal, the sensitive content is isolated from systems designed for or capable of publishing the content for public consumption to forestall inadvertent, premature publication. Another exemplary step toward helping to ensure the sensitive content 210 is not made public prematurely is for encryption engine 220 to encrypt the sensitive content 210 which results in encrypted content 230. In one example, encryption engine 220 uses known encryption algorithms including both symmetric or asymmetric encryption or encryption systems to be developed.

The encrypted content 230 may then be safely passed to a publication system 240, such as Adobe Experience Manager™, with lessened concerns regarding inadvertent early publication because even if encrypted content 230 is published, its encrypted form ensures the sensitive content cannot be readily observed. However, having the content in encrypted form introduces another potential problem, namely, how to ensure that the encrypted content 230 does indeed contain the intended sensitive content 210. As an example, incorrect, scandalous or otherwise unintended content may be accidentally or intentionally encrypted and readied for publication and recognized only when the unintended content is actually published. Such unintended content can take many varied forms ranging from merely embarrassing to exposing the publisher to liability. However, compounding that concern, the intended content is also very likely to not be released on time.

Continuing with reference to FIG. 2, the encrypted content is received in preparation engine 242, which in most cases will be a component of the publication system 240. Among other preparation and authoring tasks, preparation engine 242 will engage in a series of interactive exchanges 250 with the encryption engine 220 to prove that the encrypted content 230 contains the desired sensitive content 210 without revealing or disclosing the sensitive content 210. In one exemplary embodiment, preparation engine 242 assumes that the sensitive content 210 follows certain proof rules, such as known grammatical and formatting rules associated with the sensitive content. For example, the sensitive content 210 may be expected to be in a PDF document where PDF documents are known to contain certain PDF grammar fields such as non-printing headers, metadata, and the like. In another example, the sensitive content may be expected to include a table of contents on page 2 or a particular organization of content. The preparation engine 242 initiates an interactive exchange 250 requesting a proof sample from a randomly selected portion of the sensitive content 210 corresponding to the encrypted content 230. For example, the preparation engine 242 may request a portion expected to contain metadata fields pertaining to document size, creation date and author. In response to the request, the encryption engine 220 applies a hash function to the requested portion of the sensitive content that obscures the actual underlying content and responds to the interactive exchange 250 by returning the resulting hash with the underlying content rendered meaningless and obscured. An example alphabetic hash function is shown in Table 1.

TABLE 1

| In | Out |
|----|-----|
| A  | x   |
| a  | w   |
| B  | J   |
| b  | O   |
| C  | a   |
| *  | *   |
| *  | *   |
| *  | *   |
| Z  | f   |
| z  | M   |

Other hash functions may be applied to numerical values, dates, financial indicia, punctuation, graphical elements and other expected data.

When the preparation engine 242 receives the response to the interactive exchange 250, that is, the resulting hash, preparation engine 242 compares the hash to the expected metadata fields to assess whether they appear to relate to the inquiry, such as document size, creation date and author, to continue using the above example.

In another example, the series of interactive exchanges 250 comprise a zero knowledge proof. A zero knowledge proof generally satisfies three properties: (a) Completeness: if the statement is true, an honest verifier (that is, the preparation engine 242 in this example) will be convinced of this fact by an honest prover (that is, the encryption engine 220 in this example); (b) Soundness: if the statement is false, no cheating prover can convince the honest verifier that it is true, except with some small probability; and (c) Zero-knowledge: if the statement is true, no cheating verifier learns anything other than this fact. This is formalized by showing that every cheating verifier has some simulator that, given only the statement to be proved (and no access to the prover), can produce a transcript that "looks like" an interaction between the honest prover and the cheating verifier.

The first two of these are properties of more general interactive proof systems. The third is what makes the proof zero-knowledge.

Zero-knowledge proofs are not proofs in the mathematical sense of the term because there is some small probability, the soundness error, that a cheating prover will be able to convince the verifier of a false statement. In other words, zero-knowledge proofs are probabilistic "proofs" rather than deterministic proofs. However, there are techniques to decrease the soundness error to negligibly small values.

Again, the preparation engine 242 engages in a series of interactive exchanges 250 over a number of portions where particular grammar or formatting can be expected. After successfully completing a significant number of interactions, there is high probability that the encrypted content 230 indeed contains the sensitive content 210.

Once the preparation engine 242 successfully applies the series of interactive exchanges 250, it replicates the encrypted content 230 and provides replicated encrypted content 234 to a publishing engine 246 which in most cases will be a component of the publication system 240. The publishing engine may then publish the content 260, here the replicated encrypted content 234, for example to a webpage.

It is appreciated that this process may take some time because of the typical large sizes of the content, network accessibility, etc., and repeated attempts may be required to verify the content, prepare it and publish it. But now, because there is no danger that the actual sensitive content will be inadvertently published, the process can begin well in advance of the desired future disclosure date and time. Accordingly, the published content although perhaps available on a web-page will not act as a premature disclosure of the sensitive content because it remains encrypted.

At the desired future time, the encryption engine provides a timed encryption key 270 to the publication system 240. Typically, the key 270 is very small and replicates quickly in the preparation engine 242. As an example, a symmetric key or a private key is on the order of 256 bits as opposed to megabyte sizes typical in the content itself. After the key 270 replicates, it is provided as a replicated encryption key 274 to the publishing engine 246. The publishing engine applies the replicated key 274 and the published content 260 decrypts, and is now presented, at the desired future time, as the sensitive content in a form consumable by a user.

Embodiments of the invention provide techniques, systems, and computer-readable mediums with stored instructions that enable publishing sensitive content at a future time. The functions involved in these embodiments of the invention generally involve receiving an encrypted version of the sensitive content before the future time, applying a sequence of proof rules to a number of random portions of the encrypted version of the sensitive content, preparing the encrypted version of the sensitive content for publication, receiving an encryption key for the encrypted version of the sensitive content at the future time, and decrypting the encrypted version of the sensitive content with the encryption key to produce the sensitive content. These functions are generally implemented on one or more computing devices by performing one or more acts using one or more processors to execute algorithms of one or more operations defined in stored instructions. The operations of various exemplary algorithms that can be employed to perform these functions are illustrated in the FIGURES and throughout this specification.

The function of encrypting the sensitive content can be performed using one or more computing devices implementing various algorithms by executing stored instructions. The algorithms can include any of the exemplary techniques disclosed herein as well as modifications to the techniques herein to address particular circumstances of an implementation. The function can be performed by performing one or more acts according to these algorithms. An exemplary algorithm for encrypting the sensitive content involves symmetric (also called "secret key") encryption algorithms that use the same cryptographic keys for both encryption of plaintext and decryption of ciphertext. The keys may be identical or there may be a simple transformation to go between the two keys. Another exemplary algorithm involves asymmetric encryption (also called "public key") algorithms that use key pairs. What one key encrypts, only the other can decrypt. Frequently (but not necessarily), the keys are interchangeable, in the sense that if key A encrypts a message, then B can decrypt it, and if key B encrypts a message, then key A can decrypt it.

The function of applying a sequence of proof rules to random portions of the encrypted version of the sensitive content can be performed using one or more computing devices implementing various algorithms by executing stored instructions. The algorithms can include any of the exemplary techniques disclosed herein as well as modifications to the techniques herein to address particular circumstances of an implementation. The function can be performed by performing one or more acts according to these algorithms. An exemplary algorithm for applying a sequence of proof rules comprises requesting a sample of the sensitive content corresponding to a random portion of the encrypted version of the sensitive content, receiving a hash of the requested sample of the sensitive content that does not reveal the sensitive content, and comparing the hash to a particular aspect expected in the sample of the sensitive content. Another exemplary algorithm can involve applying a zero knowledge proof interactively verifying a series of expected formatting and grammar usages in random portions of the sensitive content without revealing the sensitive content.

Figure 3:
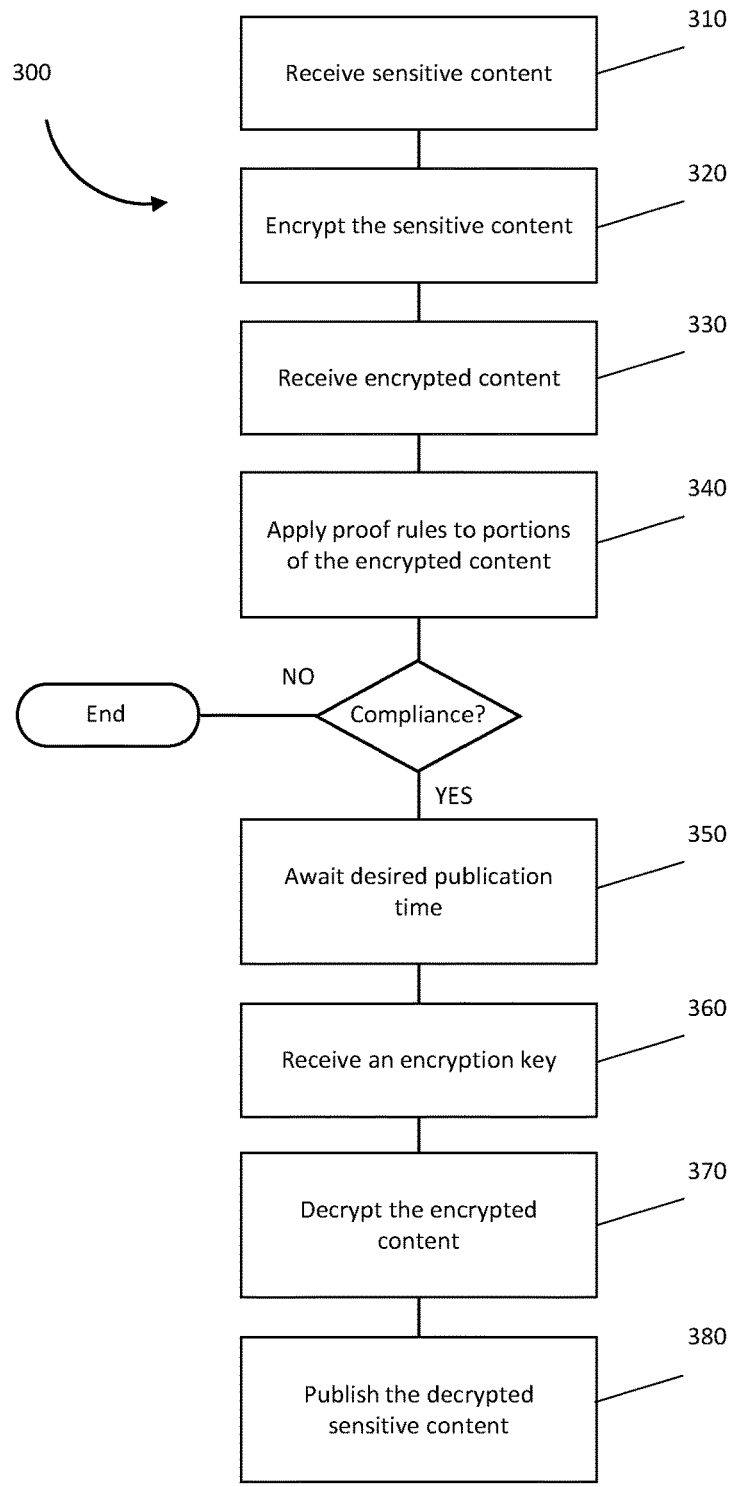
FIG. 3 is a flow chart illustrating an exemplary method for publishing sensitive content.

FIG. 3 is a flow chart illustrating an exemplary computer implemented method 300 for publishing sensitive content at a future time. Exemplary method 300 is performed by one or more processors of one or more computing devices such as computing devices of FIG. 1 or 5. Method 300 can be implemented by a processor executing instructions stored in a non-transitory computer-readable medium. Method 300 includes receiving sensitive content 310, such as a financial report with certain specific requirements for reporting or a new novel with a future release date. Method 300 further includes encrypting the sensitive content 320. Encrypting the content can be accomplished by current symmetric and asymmetric encryption algorithms or encryption processes yet to be developed. In certain embodiments, the steps of receiving sensitive content 310 and encrypting the sensitive content 320 are performed by processors separate from processors that are intended to publish content on publically available platforms. Because the sensitive content may be prepared in advance of the desired disclosure date and time, such separation adds a level of security against inadvertent disclosure.

Method 300 further includes receiving the encrypted version of the sensitive content 330. Having the sensitive content encrypted allows the content to be received and stored on a system having access to and the ability to publish content. In other words, the risk of advance or inadvertent publication is lessened because publication of the encrypted version will not cause the sensitive information to be disclosed.

Method 300 further includes applying a sequence of proof rules to portions of the encrypted version of the sensitive content 340. The proof rules are designed to ensure that the encrypted version of the sensitive information corresponds to the sensitive information without the need for the sensitive information to be available or disclosed to the publishing system. In one embodiment, the sequence of proof rules includes an interactive series of query and response between the publishing system and the encryption system as more fully discussed below in connection with FIG. 4.

Upon successful application of the sequence of proof rules, method 300 next optionally waits until the desired publication time, 350. In another embodiment, the encrypted version of the sensitive content is replicated and published. In either embodiment, at the future time, an encryption key is received 360 for the encrypted version of the sensitive content. The content is decrypted 370 using the key and the sensitive content is published 380.

Figure 4:
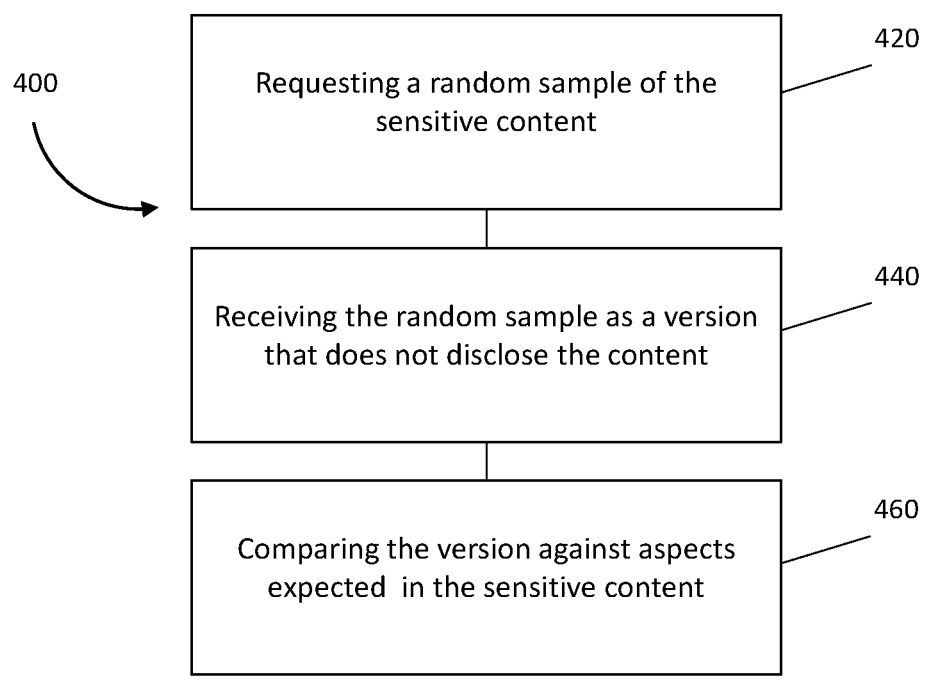
FIG. 4 is a flow chart illustrating an exemplary aspect of the method for publishing sensitive content.

FIG. 4 is a flow chart illustrating an exemplary computer implemented method 400 for applying a sequence of proof rules verifying encrypted content. Exemplary method 400 is performed by one or more processors of one or more computing devices such as computing devices of FIG. 1 or 5. Method 400 can be implemented by a processor executing instructions stored in a non-transitory computer-readable medium. Method 400 includes requesting a sample of the sensitive content corresponding to a random portion of the encrypted version of the sensitive content 420. In one general example, such a sample seeks to verify expected grammar or formatting of the sensitive content. More particularly, such a sample may seek a portion of the sensitive content expected include a table or graphical element in a financial report. In another particular example, such a sample may seek a portion expected to include a table of contents for a book or magazine.

Method 400 further includes receiving the random sample in a way that does not disclose the sensitive content 440. One way to accomplish receiving the sample without disclosing the underlying content is to apply a hash function to the requested sample of sensitive content. In one embodiment the hash function is a one way function that obscures the portion of the sensitive content but allowing examination of the underlying grammar or format or both.

The method 400 further includes comparing the received random sample that does not disclose the sensitive content to aspects that are expected to appear in the requested portion. To continue the example above, the returned hash values could be used to confirm the portion of the sensitive content contains the grammar or format expected in the requested portion such as the graphical element or the table of contents.

Method 400 repeats, preferably using a different hash function for each requested sample, until enough portions of the sensitive are tested and verified to confirm the encrypted version contains the sensitive content.

Figure 5:
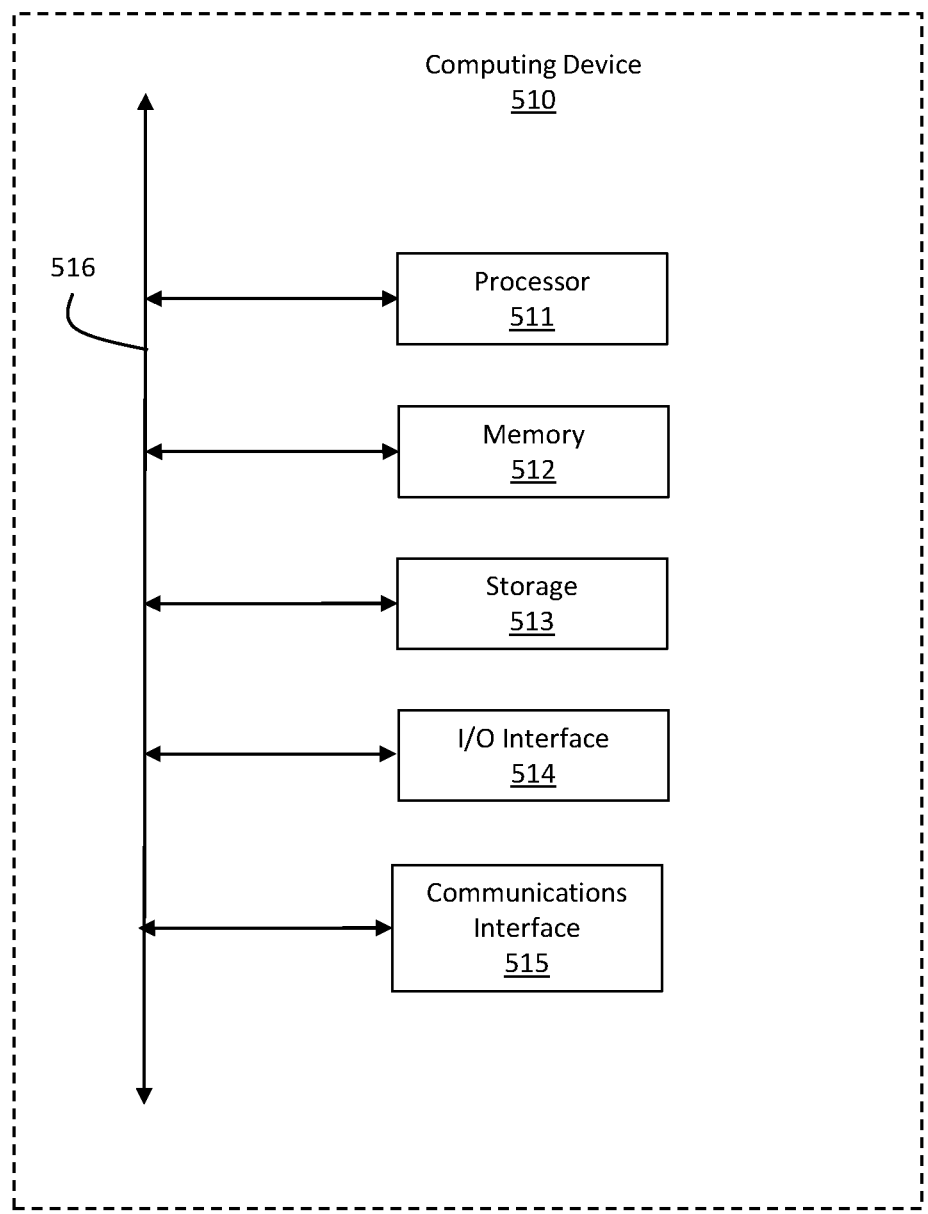
FIG. 5 is a block diagram depicting an example hardware implementation.

Any suitable computing system or group of computing systems can be used to implement the techniques and methods disclosed herein. For example, FIG. 5 is a block diagram depicting one exemplary implementation of such components. A computing device 510 can include a processor 511 that is communicatively coupled to a memory 512 and that executes computer-executable program code and/or accesses information stored in memory 512. The processor 511 may comprise a microprocessor, an application-specific integrated circuit ("ASIC"), a state machine, or other processing device. The processor 511 can include one processing device or more than one processing device. Such a processor can include or may be in communication with a computer-readable medium, including but not limited to memory 512, storing instructions that, when executed by the processor 511, cause the processor to perform the operations described herein.

The memory 512 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 510 executes program code that configures the processor 511 to perform one or more of the operations described above. Specifically, and without limitation, the program code can include code to configure the processor as an encryption engine 220, a publication system 240, a preparation engine 242 and a publishing engine 246. The program code may be resident in the memory 512 or any suitable computer-readable medium and may be executed by the processor 511 or any other suitable processor. In some embodiments, modules can be resident in the memory 512. In additional or alternative embodiments, one or more modules can be resident in a memory that is accessible via a data network, such as a memory accessible to a cloud service.

The computing device 510 may also comprise a number of external or internal devices such as input or output devices. For example, the computing device is shown with an input/output ("I/O") interface 514 that can receive input from input devices or provide output to output devices. A communication interface 515 may also be included in the computing device 510 and can include any device or group of devices suitable for establishing a wired or wireless data connection to one or more data networks. Non-limiting examples of the communication interface 515 include an Ethernet network adapter, a modem, and/or the like. The computing device 510 can transmit messages as electronic or optical signals via the interface 514. A bus 516 can also be included to communicatively couple one or more components of the computing device 510.

In one embodiment, one computing device 510 performs functions including sensitive content generation, encryption, acting on interactive proof rule requests and timed release of the encryption key while a second computing device 510 performs functions including application of the sequence of proof rules, preparation, publication and application of the encryption key to the encrypted content.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for publishing sensitive content at a future time, the method comprising:
    prior to a future time at which sensitive content is to be published, receiving an encrypted version of the sensitive content;
    applying an interactive zero knowledge proof to the encrypted version of the sensitive content, wherein applying the interactive zero knowledge proof comprises repeating more than once the steps of:
        requesting a sample of the sensitive content corresponding to a random portion of the encrypted version of the sensitive content,
        receiving a hash of the requested sample of the sensitive content that does not reveal the sensitive content, and
        comparing the hash to a particular aspect expected in the requested sample of the sensitive content,
            wherein the particular aspect expected in the sample of the sensitive content comprises grammar or format;
    upon successful application of the interactive zero knowledge proof, preparing the encrypted version of the sensitive content for publication;
    at the future time, receiving an encryption key for the encrypted version of the sensitive content;
    decrypting the encrypted version of the sensitive content with the encryption key to produce the sensitive content at a publication location from which the sensitive content is accessible via a network; and
    publishing the decrypted sensitive content.

2. The method as set forth in claim 1, wherein the grammar comprises content identifiable as portable document format (PDF).

3. The method as set forth in claim 1, wherein the grammar comprises content identifiable as hypertext markup language (HTML).

4. The method as set forth in claim 1, wherein the format comprises a table of contents.

5. The method as set forth in claim 1, wherein the format comprises a particular organization of content.

6. The method as set forth in claim 1, wherein preparing the encrypted version of the sensitive content for publication comprises storing the encrypted version of the sensitive content at the publication location prior to the future time.

7. The method as set forth in claim 6, wherein the publication location comprises one or more server locations.

8. The method as set forth in claim 6, wherein storing the encrypted version of the sensitive content comprises uploading the encrypted version of the sensitive content to the publication location prior to the future time, wherein the encrypted version of the sensitive content is available at the publication location to be decrypted without uploading the sensitive content to the publication location at the future time.

9. The method as set forth in claim 1, further comprising decrypting the sensitive content after receiving the encryption key.

10. A computer-based system for publishing sensitive content at a future time, the system comprising:
    at least one memory including instructions; and
    at least one processor that executes the instructions stored in memory, that causes the processor to implement:
        a means for receiving an encrypted version of sensitive content prior to a future time at which the sensitive content is to be published;
        a means for applying an interactive zero knowledge proof to the encrypted version of the sensitive content, wherein the means for applying the interactive zero knowledge proof comprises:
            a means for requesting a sample of the sensitive content corresponding to a random portion of the encrypted version of the sensitive content,
            a means for receiving a hash of the requested sample of the sensitive content that does not reveal the sensitive content, and
            a means for comparing the hash to a particular aspect expected in the requested sample of the sensitive content,
                wherein the particular aspect expected in the sample of the sensitive content comprises grammar or format;
        a means for preparing the encrypted version of the sensitive content for publication;
        a means for decrypting the encrypted version of the sensitive content with an encryption key provided at the future time to produce the sensitive content at a publication location from which the sensitive content is accessible via a network; and
        a means for publishing the decrypted sensitive content.

11. The computer-based system as set forth in claim 10, wherein the grammar comprises content identifiable as portable document format (PDF).

12. The computer-based system as set forth in claim 10, wherein the format comprises a table of contents.

13. A non-transitory computer-readable medium comprising instructions for causing a computing device to perform operations comprising:
    receiving an encrypted version of a sensitive document prior to a future desired publication time;
    applying an interactive zero knowledge proof to the encrypted version of the sensitive document, wherein the instructions for causing a computing device to apply the interactive zero knowledge proof comprises instructions for causing the computing device to perform operations comprising:
        requesting a sample of the sensitive content corresponding to a random portion of the encrypted version of the sensitive content,
        receiving a hash of the requested sample of the sensitive content that does not reveal the sensitive content, and
        comparing the hash to a particular aspect expected in the requested sample of the sensitive content, wherein the particular aspect expected in the sample of the sensitive content comprises grammar or format;

preparing the encrypted version of the sensitive document for publication;

at the future desired publication time, receiving an encryption key for the encrypted version of the sensitive document;

decrypting the encrypted version of the sensitive document with the encryption key to produce the sensitive document; and publishing the decrypted sensitive content.

14. The non-transitory computer-readable medium as set forth in claim 13, wherein the grammar comprises content identifiable as portable document format (PDF).

15. The non-transitory computer-readable medium as set forth in claim 13, wherein the format comprises a table of contents.

16. The non-transitory computer-readable medium as set forth in claim 13, wherein the format comprises a particular organization of content.

\* \* \* \* \*